July 11, 1933.    R. M. PREZ    1,917,853
FASTENER INSTALLATION
Original Filed Feb. 21, 1930
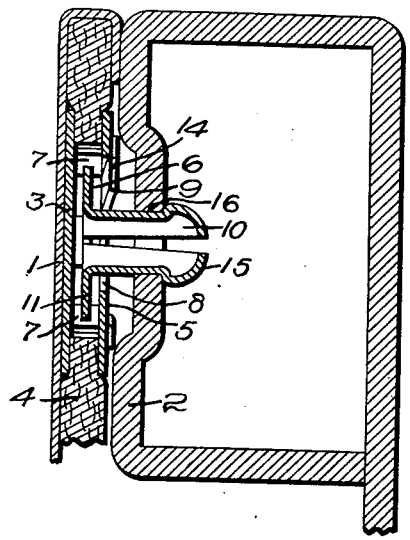
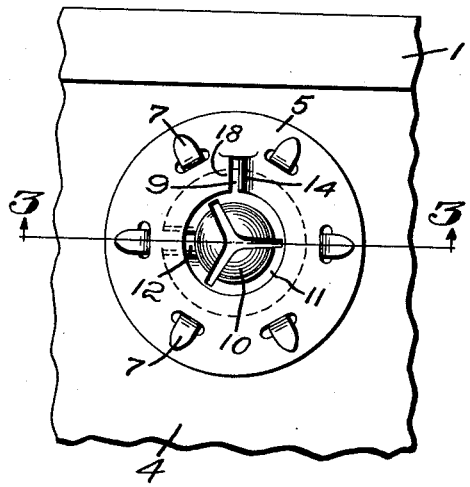
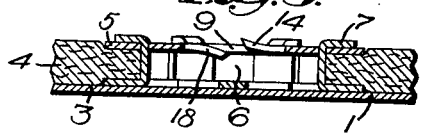
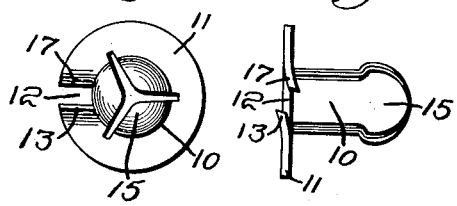
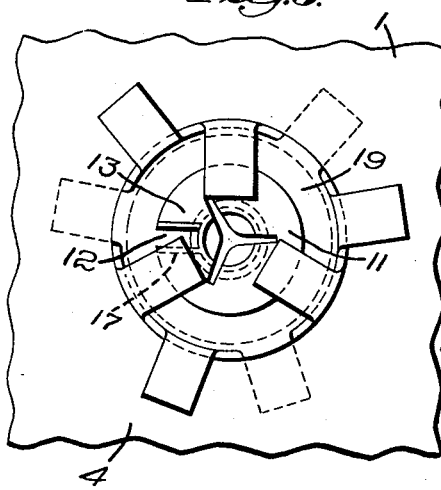
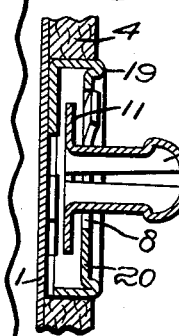
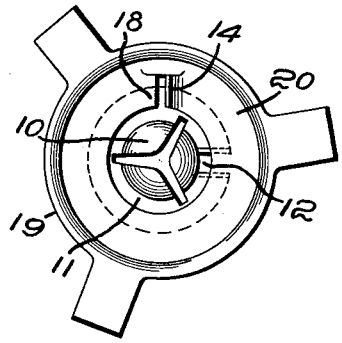
Inventor:
Robert M. Prez,
by Emery, Booth, Varney & Townsend
Attys Patented July 11, 1933

1,917,853

UNITED STATES PATENT OFFICE

ROBERT M. PREZ, OF LANSING, MICHIGAN, ASSIGNOR TO UNITED-CARR FASTENER CORPORATION, OF CAMBRIDGE, MASSACHUSETTS, A CORPORATION OF MASSACHUSETTS

FASTENER INSTALLATION

Original application filed February 21, 1930, Serial No. 430,360. Divided and this application filed December 15, 1931. Serial No. 581,161.

My invention aims to provide improvements in fastener installations particularly, though not exclusively, adapted for use in connection with trimming and upholstery work.

This application is a division of my co-pending application Serial No. 430,360, filed February 21, 1930.

In the drawing which illustrates preferred embodiments of my invention:—

Figure 1 is a section through a portion of a metal frame and an upholstery panel showing also, in cross-section, my improved fastening unit;

Fig. 2 is an elevation view of a portion of the panel at the inner side showing a snap fastener unit attached thereto;

Fig. 3 is a section taken on the line 3—3 of Fig. 2, the snap fastener member being removed;

Figs. 4 and 5 are plan and side elevations, respectively, of the stud members of the fastener unit; and Figs. 6, 7 and 8 show various views of a fastener unit with a one-piece casing.

Referring first to the embodiment of my invention illustrated by the drawing, I have shown a fastener unit and fastener installation which is a decided improvement over that illustrated in United States Letters Patent No. 1,675,998, issued to Rollo F. Walters July 3, 1928. The device shown in that patent has been used to a large extent by motor vehicle manufacturers. However, there has been some objection to the type of fastener unit shown in the patent, because of the fact that the upholstery and trim panels are usually made at a point remote from the body assembly plant to which they were shipped. One objection is to the projecting studs which keep the panels spaced apart and, therefore, take up considerable excess space in shipment. Furthermore, the studs sometimes puncture other panels and in some instances the studs become crushed.

My invention is directed to the same general type of installation and fastening means as shown in the patent, but I have so constructed the elements of the fastener units that the studs do not have to be attached as parts of the installations until they are ready to be applied at the body assembly plant. The panels may be made complete and shipped in smaller packages, because they are not spaced apart and the snap fastener members are shipped separately. By using my fastener units, the panels cannot be damaged in transit by the studs.

Referring now to the specific embodiment of my invention illustrated by Figs. 1 through 5, I have shown a thin upholstered panel 1 secured to a frame 2 by means of snap fasteners all in a manner now well known in the art.

While I am aware that the attaching means or casings, which may be used in connection with my invention, may be made in various manners to permit engagement and disengagement of the studs after the panel elements have been assembled, I have selected and will describe one form of attaching means and one form of structure for effecting my invention.

The attaching means may be of any suitable construction and secured to the panel 1 in any desired manner, but I have shown a casing which includes a part 3 located at one side of the backing 4 of the panel 1 adjacent to an opening therethrough. A second part 5 comprising a part of the casing is located at the opposite side of the backing adjacent to the opening in the backing 4. Both parts 3 and 5 of the casing overlap the opening in the backing (Figs. 1 and 3) and provide a pocket 6 therebetween. The parts 3 and 5 are attached by means of prongs 7 passing from one part through the backing and engaging the other part.

The part 5, which is the part located at the inner face of the panel 1, has an aperture 8 therethrough and also a slot 9 extending radially outwardly from the aperture, as shown in Figs. 1, 2 and 3. The material at one longitudinal edge of the slot is bent downwardly and the material at the other longitudinal edge is bent upwardly, as shown in Fig. 3.

Any type of snap fastener member having a base may be assembled with the casing. In the drawing I have shown a well known type of stud 10 having a base 11 provided with a slot 12 extending from the edge of the base inwardly, as shown in Fig. 4. The base material along the longitudinal edges of the slot 12 is bent upwardly and downwardly respectively as shown.

A stud may be easily and quickly attached to and detached from the upholstery installation by placing its base 11 against the face of the part 5 and turning the stud in a clockwise direction. During the turning movement the downwardly turned portion 13 of the base 11 will engage beneath the upwardly turned portion 14 of the part 5 and the base will thereafter be screwed into the pocket 6. When thus assembled, the upholstery panel 1 may be attached to the frame 2 by pressing the stud head 15 through the aperture 16 in the frame 2, as shown in Fig. 1.

The stud is also shiftable in the casing in the same manner and for the same purpose as set forth in the patent referred to above.

To detach the stud from the casing it is merely necessary to pull on the stud and turn it in a contra-clockwise direction. This action will cause the upwardly turned portion 17 of the base 11 of the stud to pass over the downwardly turned portion 18 of the part 5, thereby unscrewing the stud.

In Figs. 6 through 7, I have shown a casing 19 which is made from a single piece of metal and which has a recess 20 in one face to assist in guiding the stud into engagement with the casing. Aside from these differences the casing is the same and receives and holds a stud in the same manner as the casing described in connection with Figs. 1 through 5.

While I have illustrated and described preferred embodiments of my invention, I do not wish to be limited thereby, as the scope of my invention is best defined by the following claims.

I claim:

1. The method of assembling an installation including a supporting structure made up of several layers of material and a quick detachable fastener member having a base embedded within the layers of material of the supporting structure which comprises assembling the layers comprising the supporting structure and therefore forcing the base of the fastener into embedded relation with the supporting structure by rotation only.

2. An installation of the class described comprising, in combination, a supporting structure of layers of relatively thin material, a quickly detachable snap fastener member having a thin base embedded within said supporting structure and separable attaching means provided partly by the supporting structure and partly by the snap fastener member whereby said snap fastener member may be attached with and detached from said supporting structure only by relative rotation, said separable attaching means comprising an aperture and a ledge adjacent thereto presented by the supporting structure and the thin base provided by the snap fastener member, said base having a slot at one side thereof whereby said base flange may be engaged with said ledge through said aperture by rotation of the snap fastener member.

3. An installation of the class described comprising, in combination, a frame covering structure formed with a plurality of layers of relatively thin material adjacent to the edge of the structure, a quickly attachable snap fastener member having a relatively thin base floatingly positioned within the frame covering structure, one of the layers of material of said structure having an aperture of fixed dimensions therein exposed at one face only of said structure and being of smaller area than the area of the base of the snap fastener member, a shank extending from said fastener base through the said aperture and being of smaller cross-sectional area than the area of said aperture thereby to permit the floating of the fastener member relative to the covering structure, and said snap fastener member base having a slot at one side thereof providing the only means of the base permitting the base to pass through said aperture in said covering structure only by rotation of the snap fastener member.

In testimony whereof, I have signed my name to this specification.

ROBERT M. PREZ.

CERTIFICATE OF CORRECTION.

Patent No. 1,917,853.                                                      July 11, 1933.

ROBERT M. PREZ.

It is hereby certified that error appears in the printed specification of the above numbered patent requiring correction as follows: Page 1, line 22, for "members" read "member"; page 2, line 50, claim 1, for "therefore" read "thereafter"; and that the said Letters Patent should be read with these corrections there in that the same may conform to the record of the case in the Patent Office.

Signed and sealed this 29th day of August, A. D. 1933.

M. J. Moore.

(Seal)                                                                       Acting Commissioner of Patents.